United States Patent [19]

Tung-Chow

[11] Patent Number: 4,681,149

[45] Date of Patent: Jul. 21, 1987

[54] WINDOW BLINDS FOR VEHICLES

[75] Inventor: Siu Tung-Chow, New Territories, Hong Kong

[73] Assignee: Tai Cheong Blinds Company Ltd., Kwai Chung, Hong Kong

[21] Appl. No.: 777,493

[22] Filed: Sep. 19, 1985

[51] Int. Cl.⁴ .............................................. B60J 3/00
[52] U.S. Cl. ................................ 160/134; 296/95 R; 296/97 D; 160/DIG. 3
[58] Field of Search ................. 160/134, DIG. 3; 296/97 R, 97 G, 97 D

[56] References Cited

U.S. PATENT DOCUMENTS

| | | | |
|---|---|---|---|
| 1,450,142 | 3/1923 | Dietrich | 160/134 |
| 1,510,984 | 10/1924 | Dorsey et al. | |
| 1,613,364 | 1/1927 | Thompson | |
| 2,517,281 | 8/1953 | Brown | 160/134 |
| 2,519,222 | 8/1950 | Brooks | |
| 2,560,762 | 7/1951 | Ghegan | |
| 3,003,812 | 10/1961 | Haugland | |
| 3,021,173 | 2/1962 | Levin | |
| 3,649,069 | 3/1972 | Zip | 296/97 G |
| 4,332,414 | 6/1982 | Surtin | |
| 4,606,572 | 8/1986 | Maguire | 160/134 |

FOREIGN PATENT DOCUMENTS 941197 7/1969 United Kingdom .

OTHER PUBLICATIONS

Advertisement in "Hardwares", Apr. 1977, p. 29.
Advertisement in "Hardware", May 1978, p. 103.
Advertisement in "Hardware", Nov. 1979, p. 89.

Primary Examiner—Reinaldo P. Machado
Attorney, Agent, or Firm—Sandler & Greenblum

[57] ABSTRACT

A window-blind for use in vehicles which includes a suction-cup for removably attaching a window-blind to a window of the vehicle and a plurality of elongated slats, each of the slats having one end pivotally connected to the suction-cup. The plurality of slats are stacked one on top of another when the window-blind is in a closed position, and are opened into a fan-shaped blind when the window-blind is in an open position. A connecting tape connects adjacent slats to each other and retains the window-blind in the fan-shape when the window-blind is in an open position. Each slat includes six apertures. The apertures are spaced approximately equi-distant from one another across the width of each slat. The connecting tape is wound through the apertures such that the tape is fed from a first side of a slat through a sixth aperture to a second side of the slat, through a fifth aperture back to the first side, through a fourth aperture back to the second side, through a third aperture back to the first side, passing over a second aperture along the first side, through a first aperture back to the second side, through the second aperture back to said first side, through the third aperture, adjacent to itself, back to the second side and to a first side of an adjacent slat. Such construction provides a strong bond between the slats, making the window-blinds extremely durable.

7 Claims, 18 Drawing Figures

WINDOW BLINDS FOR VEHICLES

BACKGROUND OF THE INVENTION

1. Field of the Invention

The present invention relates generally to window blinds for vehicles, and more particularly to window blinds which can be fanned out to protect the interior of a vehicle from heat and sunlight.

2. Discussion of Prior Art

When a vehicle is left in the sun for any amount of time, the interior of the vehicle becomes very warm due to the sun shining in through the windshield. One easy way to keep the sun out of the vehicle is to place cardboard sheets across the windshield of the vehicle when left in the sun. Obviously, this is not very convenient as one does not always have such sheets available. In 1969, British Design Pat. No. 941,197 isssued to the present inventor for a blind primarily for use on vehicles to shade against the sun.

U.S. Pat. No. 4,332,414 to SURTIN discloses an automobile window shade device which is in the shape of a fan and which includes slats which are flat. This patent discloses the use of only four slots through which a connecting tape is wound, resulting in a fan which cannot be easily controlled while spreading into its open position.

It is accordingly an object of this invention to provide a secure arrangement for winding the tape through the aperatures in the slats, which arrangement will insure that the position of the fan will be accurately controlled during opening and closing. The arrangement will also securely position the fan when it is in either of these two positions.

It is additionally an object of this invention to wind the tape through the slats in such a way as to maintain the slats in proximate and equi-distant position when the window blind is in operation.

SUMMARY OF THE INVENTION

According to a first embodiment of the invention a window-blind is used in vehicles which includes means for removably attaching the window-blind to a window of the vehicle and a plurality of elongated slats. Each of the slats has one end pivotally connected to the attaching means. The plurality of slats are stacked one on top of another when the window-blind is in a closed position, and are opened into a fan-shaped when the window-blind is in an open position. A connecting tape connects adjacent slats to each other and retains the window-blind in the fan-shape when the window-blind is in an open position. Each slat includes six apertures. The apertures are spaced approximately equi-distant from one another across the width of each slat. The connecting tape is wound through the apertures such that the tape is fed from a first side of each slat through a sixth aperture to a second side of each slat, through a fifth aperture back to the first side through a fourth aperture back to the second side, through a third aperture back to the first side, thereafter passing over a second aperture along the first side, through a first aperture back to the second side, through the second aperture back to the first side, through the third aperture, adjacent to itself, back to the second side and then to a first side of an adjacent slat.

According to a second embodiment of the invention, a window-blind for use in vehicles includes means for removably attaching the window-blind to a window of the vehicle and a plurality of elongated slats. Each of the slats has one end pivotally connected to the attaching means. The plurality of slats are stacked one on top of another when the window-blind is in a closed position, and are opened into a fan-shape when the window-blind is in an open position. A connecting tape connects adjacent slats to each other and retains the window-blind in the fan-shape when the window-blind is in an open position. Each slat includes six apertures. The apertures are spaced across the width of each slat such that a sixth aperture is positioned adjacent to one elongated edge of each slat and five apertures are positioned in a group adjacent the other elongated edge of each slat. The connecting tape is wound through the apertures such that the tape is inserted from a first side of each slat through the sixth aperture to a second side of each slat, through a fifth aperture back to the first side, thereafter passing over a fourth and a third and a second aperture along the first side, through a first aperture back to the second side, through the second aperture back to the first side, through the third aperture back to the second side, through the fourth aperture back to the first side, and through the fifth aperture, adjacent to itself, back to the second side, and then to a first side of an adjacent slat.

According to a third embodiment of the invention, a window-blind for use in vehicles includes means for removably attaching the window-blind to a window of the vehicle and a plurality of elongated slats. Each of slats has one end pivotally connected to the attaching means. The plurality of slats are stacked one on top of another when the window-blind is in a closed position, and are opened into a fan-shape when the window-blind is in an open position. A connecting tape connects adjacent slats to each other or the most closely adjacent slat and retains the window-blind in the fan-shape when the window-blind is in an open position. Each slat includes six apertures. The apertures are spaced across the width of each slat such that a sixth aperture is positioned adjacent to one elongated edge of each slat and five apertures are placed in a group adjacent the other elongated edge of each slat. The connecting tape is wound through the apertures such that the tape is inserted from a first side of each slat through the sixth aperture to a second side of each slat, through a fifth aperture back to the first side, thereafter passing over a fourth aperture along the first side through a third aperture back to the second side, through a second aperture back to the first side, through a first aperture back to the second side, passing over the second and third apertures along the second side, through the fourth aperture back to the first side, and through the fifth aperture, adjacent to itself, back to the second side and then to a first side of the next successive, i.e., most closely adjacent, slat.

According to a fourth embodiment of the invention a window-blind for use in vehicles includes means for removably attaching the window-blind to a window of the vehicle and a plurality of elongated slats. Each of the slats has one end pivotally connected to the attaching means. The plurality of slats are stacked one on top of another when the window-blind is in a closed position, and are opened into a fan-shape when the window-blind is in an open position. A connecting tape connects adjacent slats to each other and retains the window-blind in the fan-shape when the window-blind is in an open position. Each slat includes five apertures. The apertures are spaced across the width of each slat, such that a fifth aperture is positioned adjacent one elongated edge of each slat and four apertures are positioned adjacent a second elongated edge of each slat. The connecting tape is wound through the apertures such that the tape is inserted from a first side of each slat through the fifth aperture to a second side of each slat, through a fourth aperture back to the first side, passing over a third and a second aperture along the first side, through a first aperture back to the second side, through the second aperture back to the first side, through the third aperture back to the second side and to a first side of an adjacent slat.

According to a fifth embodiment of the invention, a window-blind for use in vehicles includes means for removably attaching the window-blind to a window of the vehicle and a plurality of elongated slats. Each of the slats have one end pivotally connected to the attaching means. The plurality of slats are stacked one on top of another when the window-blind is in a closed position, and are opened into a fan-shape when the window-blind is in an open position. A connecting tape connects adjacent slats to each other and retains the window-blind in the fan-shape when the window-blind is in an open position. Each slat includes five apertures. The apertures are spaced approximately equi-distant from one another across the width of each slat. The connecting tape is wound through said apertures such that the tape is inserted from a first side of each slat through a fifth aperture to a second side of each slat, through a fourth aperture back to the first side, passing over a third and a second aperture along the first side, through a first aperture back to the second side, through the second aperture back to the first side, passing over the third aperture along the first side, through the fourth aperture, adjacent to itself, back to the second side, through the third aperture back to the first side, through the second aperture, adjacent to itself, back to the second side and to a first side of an adjacent slat.

According to a sixth embodiment of the invention a window-blind for use in vehicles includes means for removably attaching the window-blind to a window of the vehicle and a plurality of elongated slats. Each of the slats have one end pivotally connected to the attaching means. The plurality of slats are stacked one on top of another when the window-blind is in a closed position, and are opened into a fan-shaped blind when the window-blind is in an open position. A connecting tape connects adjacent slats to each other and retains the window-blind in the fan-shape when the window-blind is in an open position. Each slat includes five apertures. The apertures are spaced across the width of each slat such that a fifth aperture is positioned adjacent one elongated edge of each slat and four apertures are positioned adjacent the other elongated edge of each slat. The connecting tape is wound through the apertures such that the tape is inserted from a first side of each slat through the fifth aperture to a second side of each slat, through a fourth aperture back to the first side, through a third aperture back to the second side, through a second aperture back to the first side, through a first aperture back to the second side, passing over the second aperture along the second side, through the third aperture, adjacent to itself, back to the first side, through the fourth aperture, adjacent to itself, back to the second side and to a first side of an adjacent slat.

The attaching means includes at least one suction cup.

Each of the slats is curved. The first side of each of the slats is convex, and the second side of each of the slats is concave.

BRIEF DESCRIPTION OF THE DRAWINGS

The present invention will now be described with reference to the annexed drawings and description given by way of example in which.

DETAILED DESCRIPTION OF PREFERRED EMBODIMENTS

Figure 1:
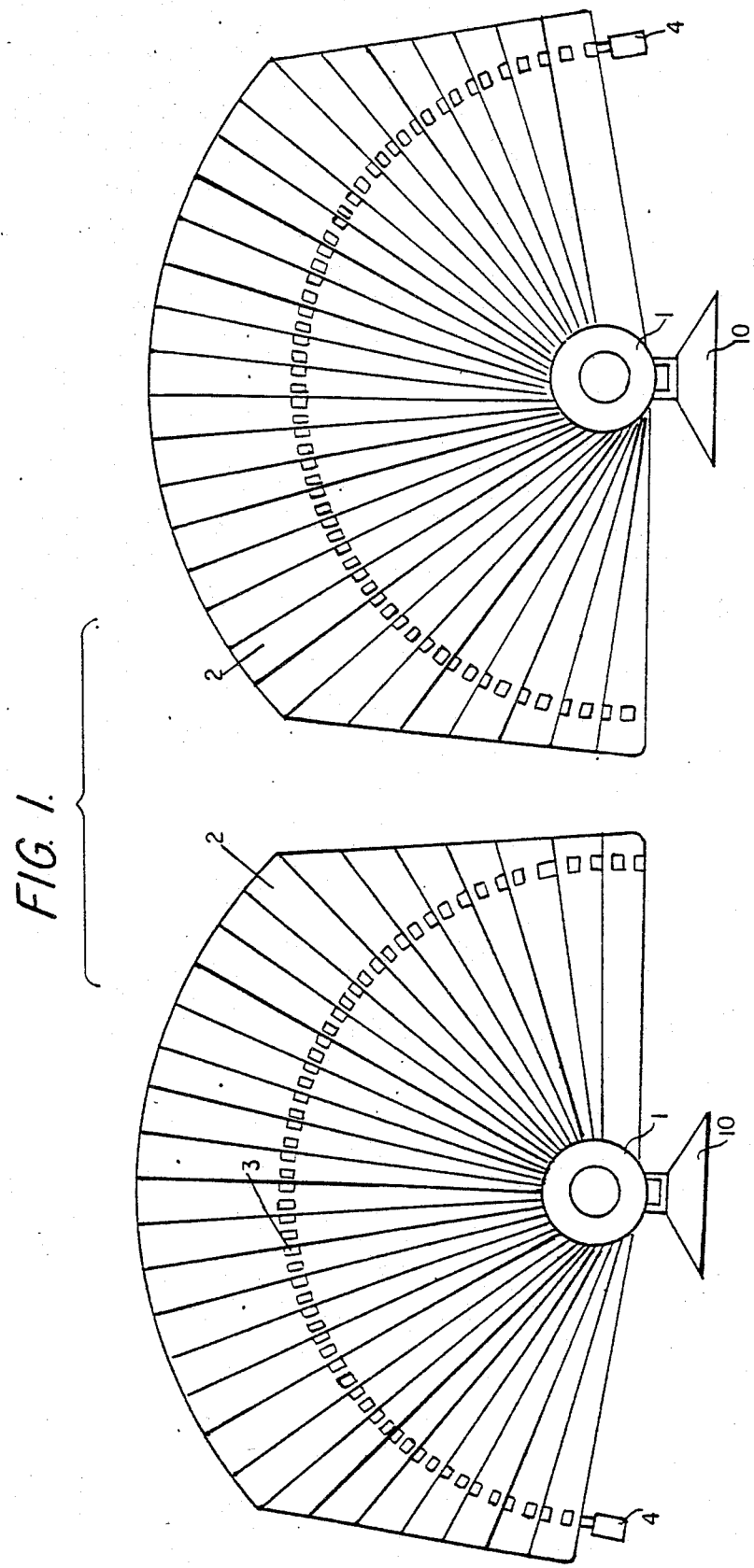
FIG. 1 is a front elevational view of vehicle blinds formed in accordance with the present invention when in their open position.

FIG. 1 is an elevational view of the window blinds of the present invention, when in their open position. Suction cup 1 is used to secure the blinds to the windshield of the car or other vehicle in front of the dashboard or rear shelf, thus shielding the inside of the vehicle from sunlight. The blinds consist of a plurality of elongated, curved slats 2, connected together by elongated flexible tape 3. Slats 2 are pivotally secured, at one end, to suction cup 1. Blind puller 4 is used to aid the user in opening the closed blind by fanning the slats out from a closed position in which the slots are stacked, into an open position in which the slats are fanned out.

Figure 2A:
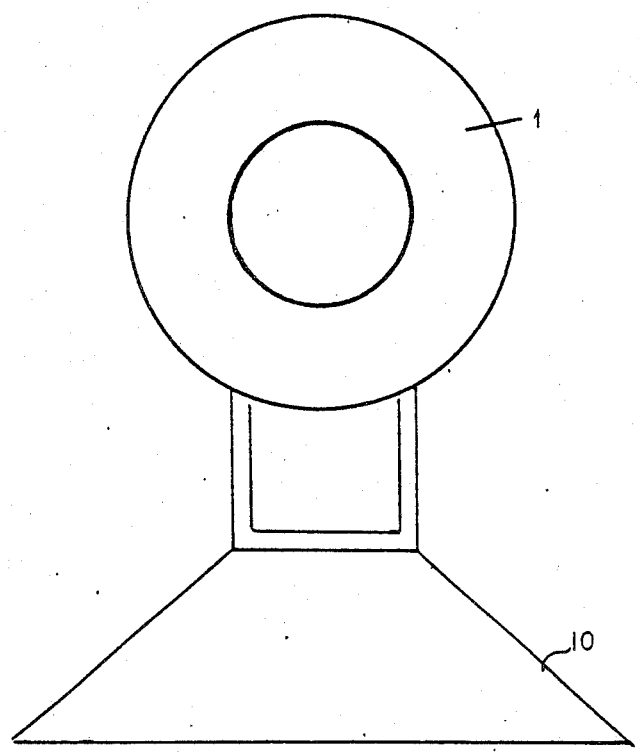
FIG. 2A is a front elevational view of a suction cup used to attach the blinds to a window.
Figure 2B:
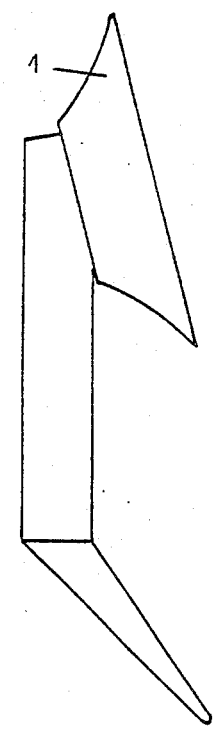
FIG. 2B is a side elevational view of the suction cup of FIG. 2A.
Figure 2C:
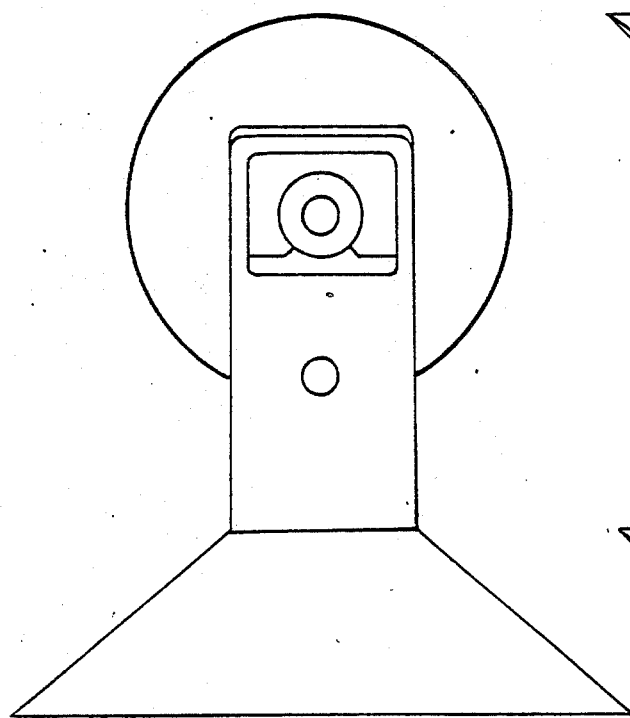
FIG. 2C is a rear elevational view of the suction cup of FIG. 2A.
Figure 2D:
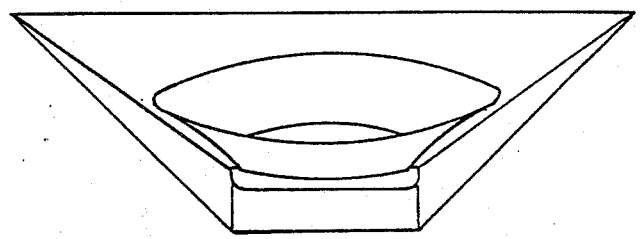
FIG. 2D is an elevational view of one end of the suction cup of FIG. 2A.
Figure 2E:
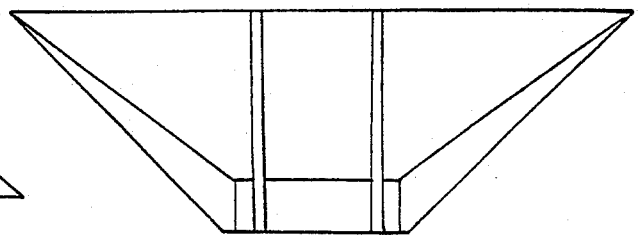
FIG. 2E is an elevational view of a second end of the suction cup of FIG. 2A.

FIGS. 2A-2E illustrate different views of the suction cup attachment device 1. FIG. 2A is a front elevational view of suction cup 1. Support or bracket 10 rests against the bottom of the windshield or the rear window when the blinds are in operation, i.e., when they are positioned in a vehicle. FIG. 2B is a side elevational view; FIG. 2C is a rear elevational view; and FIGS. 2D and 2E are elevational views of each end of suction cup 1.

Figure 3A:
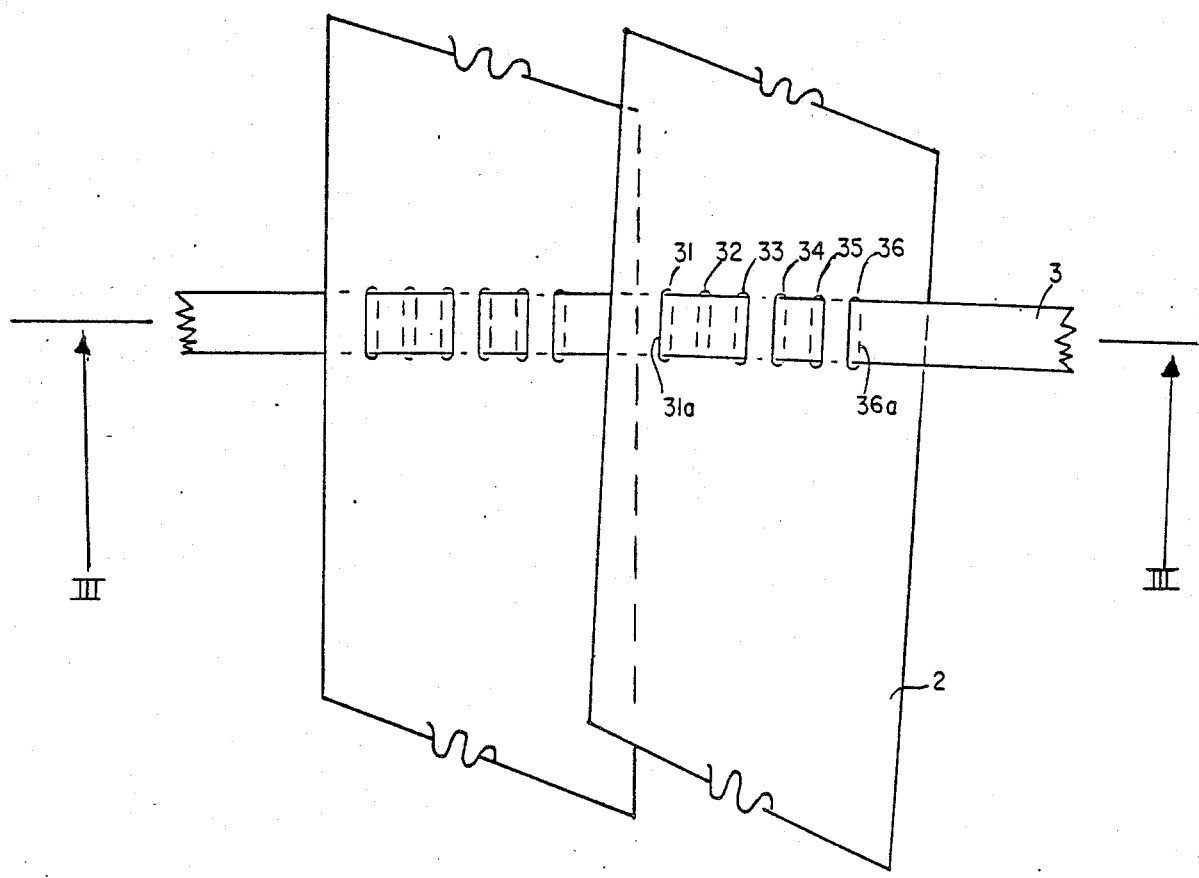
FIG. 3A is a partial plan view of a first embodiment of the slats used in the window blinds of FIG. 1.
Figure 3B:
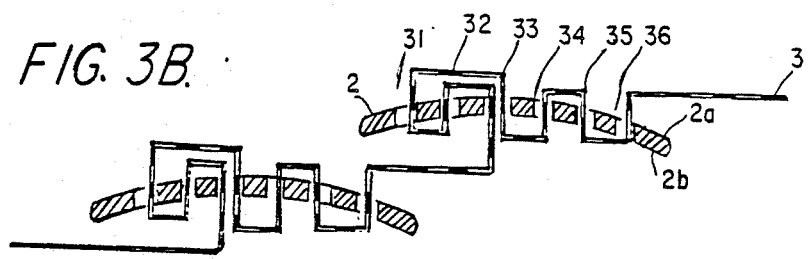
FIG. 3B is a cross-sectional view taken along lines III—III of FIG. 3A.

FIGS. 3A and 3B illustrate a first embodiment of the invention. Each slat 2 includes six slots or apertures (i.e., first through sixth), 31, 32, 33, 34, 35, and 36 which are placed in a row across the width of each slat. Each of the apertures has the same width and length, the length of each of the apertures being slightly greater than the width of tape 3. Tape 3 runs through each successive slat in proximate and equi-distant position when the window blind is open and in operation. Each aperture is spaced from the next successive aperture at a distance approximately equal to two times the width of the individual apertures. This distance is measured from the edge of each aperture to the edge of the next successive aperture. Side 36a of aperture 36 is positioned at a distance from one elongated edge of slat 2 which is approximately equal to five times the width of the apertures. Side 31a of aperture 31 is located at a distance from the outer edge of slat 2 which is approximately equal to four times the width of the apertures.

FIG. 3B is a cross-sectional view taken along lines III—III of FIG. 3A. FIG. 3B illustrates the pattern in which tape 3 is wound through apertures 31-36. Tape 3 is inserted from the convex first side 2a of slat 2 through aperture 36, the endmost aperture. Tape 3 is alternately wound up and down through apertures 35 and 34 until it is brought to the convex first side 2a of slat 2 through aperture 33. Tape 3 is then passed over aperture 32, the next successive aperture, and is fed through aperture 31, the last aperture, to the concave second side 2b of slat 2. Tape 3 is brought back through aperture 32 to the convex side 2a underneath itself and down through aperture 33 adjacent to itself to the concave side 2b of slat 2. Tape 3 is then wound through the next successive slat in the same pattern. This allows the slats to be securely bound in proximate and equi-distant position when the window blind is in operation.

Figure 4A:
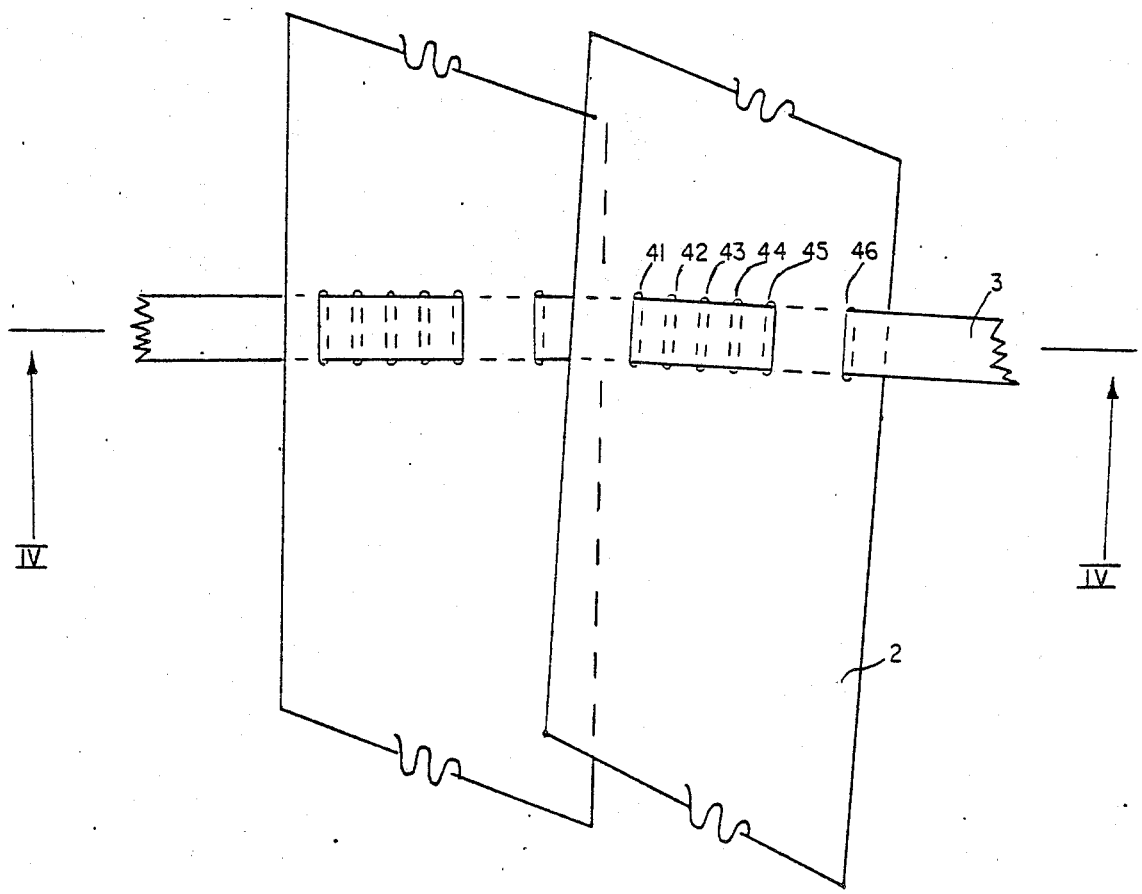
FIG. 4A is a partial plan view of a second embodiment of the slats used in the window blinds of FIG. 1.
Figure 4B:
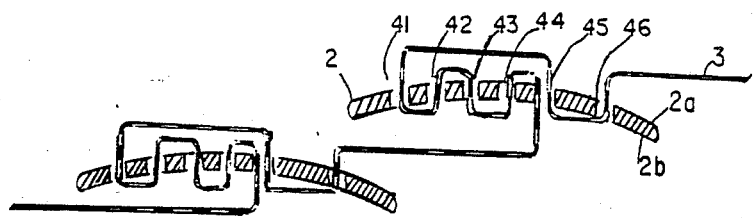
FIG. 4B is a cross-sectional view taken along line IV—IV of FIG. 4A.

FIGS. 4A and 4B illustrate a second embodiment of the invention. Each slat 2 includes six apertures (41-46) placed in a row across the width of each slat 2. Aperture 46 is positioned alone, closely adjacent to one elongated edge of slat 2. Apertures 41-45 are grouped together in the vicinity of the other elongated edge of slat 2.

FIG. 4B is a cross-sectional view of FIG. 4A taken along lines IV—IV and illustrates a pattern in which tape 3 is wound through apertures 41-46. Tape 3 is inserted from the convex first side 2a of slat 2 through aperture 46, the endmost aperture. Tape 3 is brought up through aperture 45, the next successive aperture. Tape 3 is then brought across the top of the convex side 2a of slat 2 and brought down to the concave second side 2b through aperture 41. Tape 3 is then wound up and down alternately through apertures 42-44, underneath itself, and finally brought down to the concave side 2b through aperture 45, adjacent to itself. Tape 3 is then wound through the next successive slat in the same pattern.

Figure 5A:
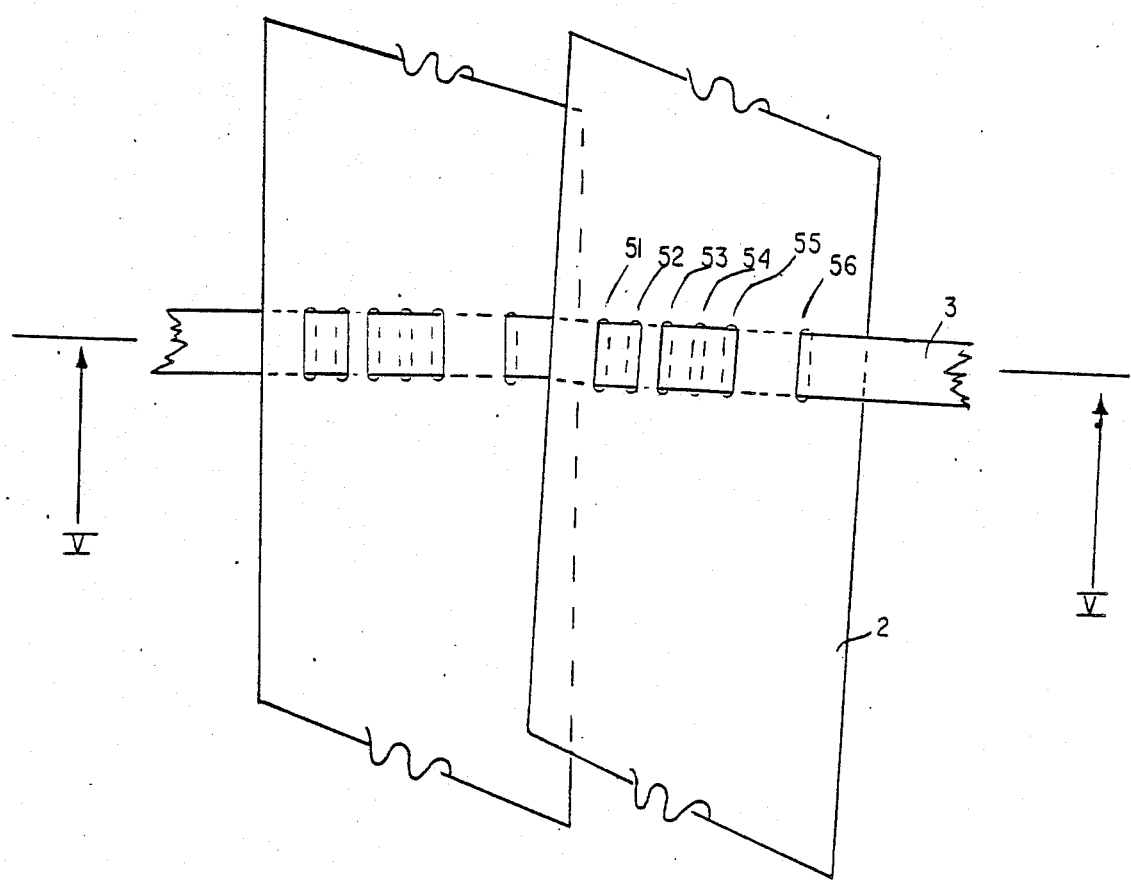
FIG. 5A is a partial plan view of a third embodiment of the slats used in the window blinds of FIG. 1.
Figure 5B:
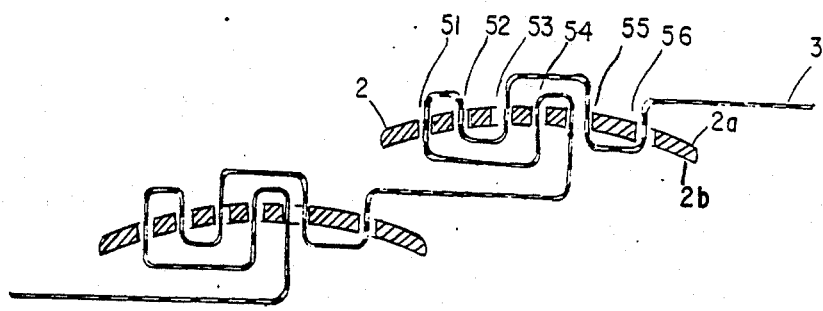
FIG. 5B is a cross-sectional view taken along lines V—V of FIG. 5A.

FIGS. 5A and 5B illustrate a third embodiment of the invention, wherein each slat 2 includes six apertures (51-56) placed in a row across the width of each slat. The apertures are grouped as in FIG. 4A wherein aperture 56 is positioned by itself adjacent one elongated side of slat 2, and apertures 51-55 are grouped together towards the other elongated side of slat 2.

FIG. 5B is a cross-sectional view taken along lines V—V of FIG. 5A which illustrates tape 3 as it is wound through the slats. Tape 3 is inserted from the convex first side 2a of slat 2 through aperture 56, the endmost aperture. Tape 3 is then brought up through aperture 55, the next successive aperture, and runs along the convex side 2a over aperture 54 and down through aperture 53. Tape 3 is brought up through aperture 52 and down through 51 to the concave second side 2b. Tape 3 is then returned to the convex side 2a through aperture 54, underneath itself, and brought down through aperture 55 adjacent to itself. Tape 3 is then wound through the next successive slat in the same pattern.

Figure 6A:
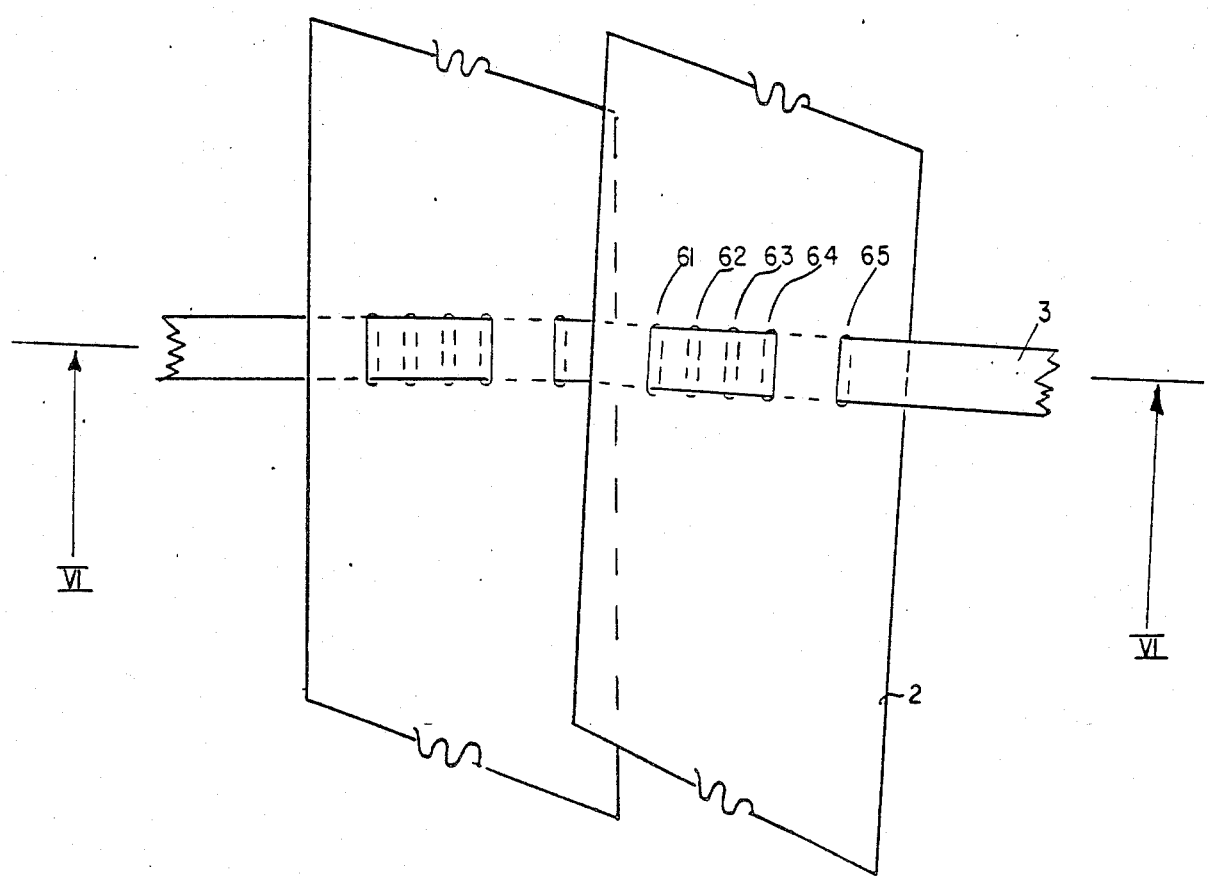
FIG. 6A is a partial plan view of a fourth embodiment of the slats used in the window blinds of FIG. 1.
Figure 6B:
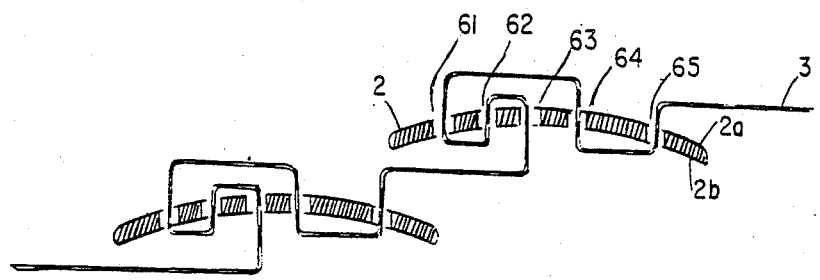
FIG. 6B is a cross-sectional view taken along lines VI—VI of FIG. 6A.

FIGS. 6A and 6B illustrate the fourth embodiment of the invention. Each slat 2 includes five apertures (61-65) which are placed in a row across the width of each slat. Aperture 65 is positioned closest to one elongated edge of slat 2, whereas apertures 61-64 are grouped together towards the other elongated edge of slat 2.

FIG. 6B illustrates a cross-sectional view illustrating the method of winding tape 3 through slat 2, taken along lines VI—VI of FIG. 6A. Tape 3 is inserted through aperture 65 from the convex first side 2a through to the concave second side 2b and brought up through aperture 64, the next successive aperture. Tape 3 is then brought across the convex side 2a and inserted through aperture 61, the aperture on the opposite end of slat 2 from aperture 65. Tape 3 is then returned through aperture 62 to the convex side 2a, underneath itself, and brought down through aperture 63 to the concave side 2b of slat 2. Tape 3 is then wound through the next slat in the same pattern.

Figure 7A:
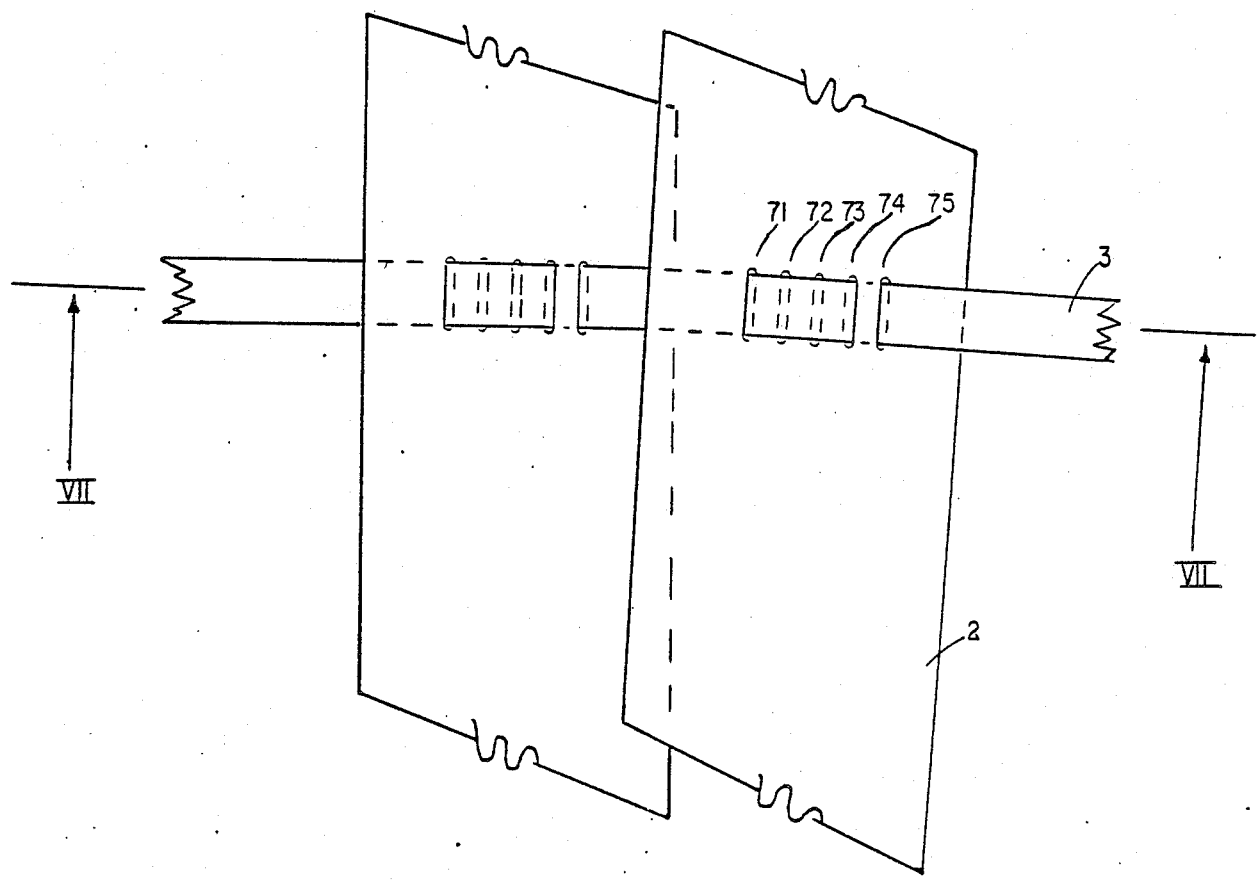
FIG. 7A is a partial plan view of a fifth embodiment of the slats used in the window blinds of FIG. 1.
Figure 7B:
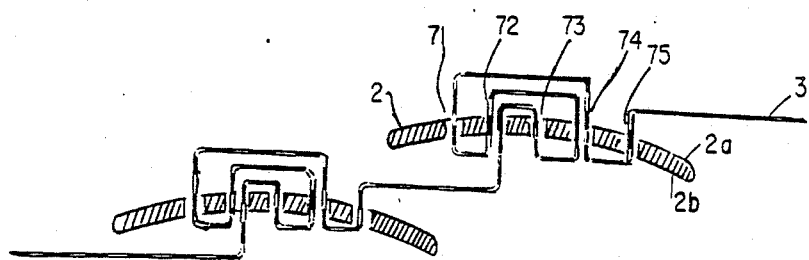
FIG. 7B is a cross-sectional view taken along lines VII—VII of FIG. 7A.

FIGS. 7A and 7B illustrate a fifth embodiment of the invention wherein apertures 71-75 are placed in the central portion of the width of slat 2. The apertures are spaced apart from one another by a substantially equal distance. FIG. 7B illustrates a cross-sectional view taken along lines VII—VII of FIG. 7A. Tape 3 is inserted through aperture 75 from the convex first side 2a through to the concave second side 2b of slat 2. It is then brought up through aperture 74 and across the convex side 2a, passing over apertures 73 and 72, and brought down through aperture 71 to the concave side 2b. It is then fed through aperture 72 and passes over aperture 73, underneath itself, and brought down through aperture 74, adjacent to itself. Tape 3 is then returned up through aperture 73, and returned down through aperature 72 to the concave side 2b adjacent to itself. Tape 3 is then wound through the next successive slat in the same pattern.

Figure 8A:
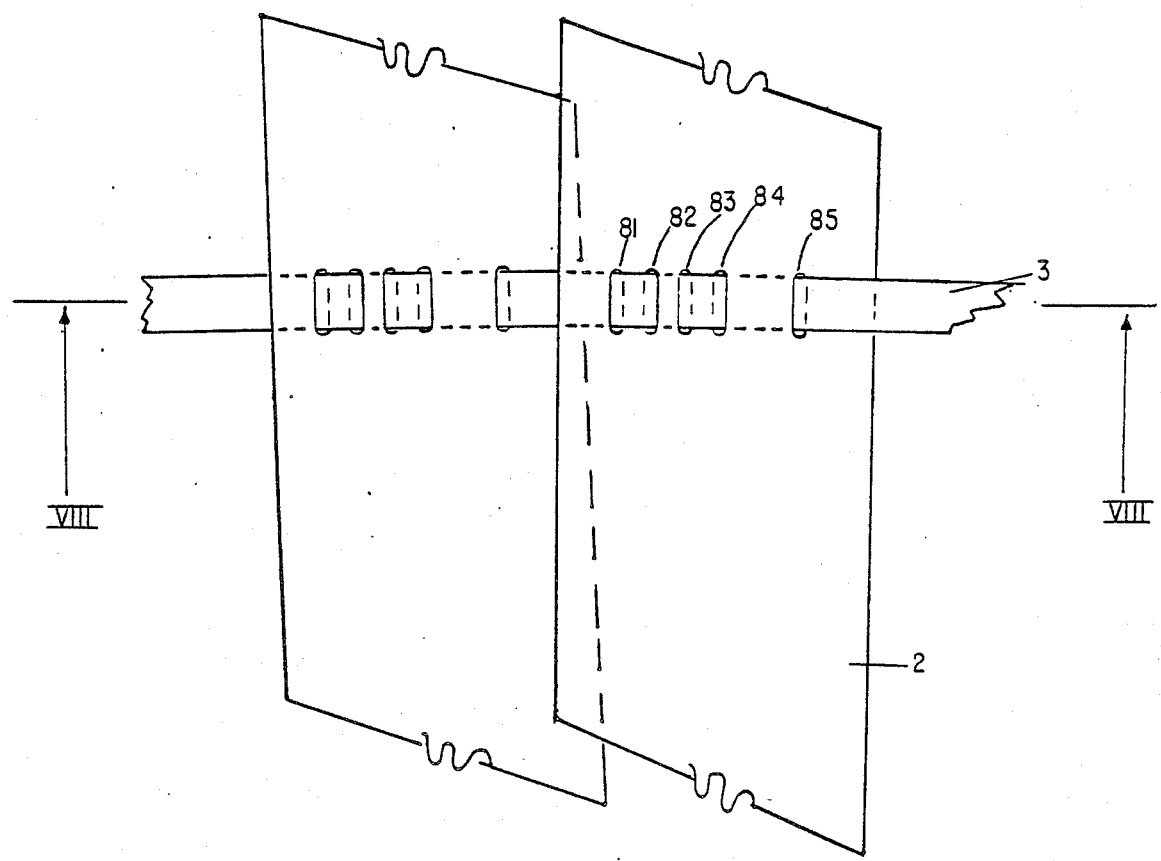
FIG. 8A is a partial plan view of of sixth embodiment of the slats used in the window blinds of FIG. 1.
Figure 8B:
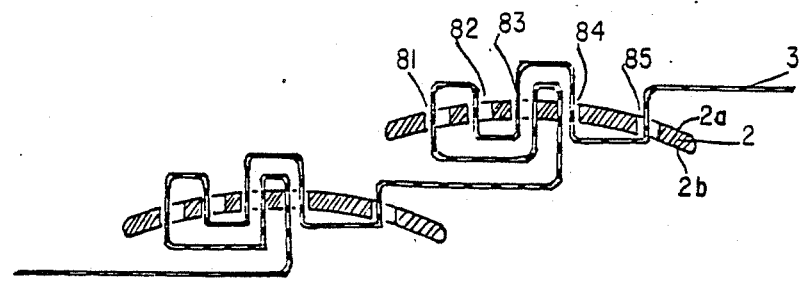
FIG. 8B is a cross-sectional view taken along lines VIII—VIII of FIG. 8A.

FIGS. 8A and 8B illustrate the sixth embodiment of the invention, which includes five apertures placed in a row across the width of slat 2. Aperture 85 is positioned towards one elongated side of slat 2, wherein apertures 81-84 are positioned in a group together towards the other elongated side of slat 2.

FIG. 8B is a cross-sectional view taken along lines VIII—VIII of FIG. 8A which illustrates the method by which tape 3 is wound through slat 2. Tape 3 is inserted from the convex first side 2a through aperture 85 and brought up again through aperture 84, down through aperture 83, up through aperture 82, and down through aperture 81. Tape 3 is then passed over aperture 82 and brought up through aperture 83 adjacent to itself, and then brought down through aperture 84 adjacent to itself again. Tape 3 is then wound through the next successive slat in the same pattern.

The arrangements of the tape and slats in the manners specifically set forth above enables the tape to tightly and precisely control the opening and closing of the fan; this is achieved by the use of at least five slats through which the tape is wound.

Although the invention has been described with particular reference to specific embodiments, it is understood that the invention contemplates any modifications within the skill of one of ordinary skill in the art and within the scope of the claims.

What is claimed is:

1. A window-blind for use in vehicles comprising:
 (a) means for removably attaching said window-blind to a window of said vehicle;
 (b) a plurality of elongated slats, each of said slats having one end pivotally connected to said attaching means, said plurality of slats being stacked one on top of another when said window-blind is in a closed position, and being opened into a fan-shape when said window-blind is in an open position; and
 (c) a connecting tape for connecting adjacent slats to each other and for retaining said window-blind in said fan-shape when said window-blind is in an open position, wherein each slat comprises six apertures, said apertures being spaced across the width of each slat such that a sixth aperture is positioned adjacent to one elongated edge of each slat and five apertures are positioned in a group adjacent a second elongated edge of each slat,
 wherein said connecting tape is wound through said apertures such that said tape is inserted from a first side of each slat through said sixth aperture to a second side of each slat, through a fifth aperture back to said first side, thereafter passing over a fourth and a third and a second aperture along said first side, through a first aperture back to said second side, through said second aperture back to said first side, through said third aperture back to said second side, through said fourth aperture back to said first side, and through said fifth aperture, adjacent to itself, back to said second side, and then to a first side of an adjacent slat.

2. A window-blind for use in vehicles comprising:
 (a) means for removably attaching said window-blind to window of said vehicle;
 (b) a plurality of elongated slats, each of said slats having one end pivotally connected to said attaching means, said plurality of slats being stacked one on top of another when said window-blind is in a closed position, and being opened into a fan-shape when said window-blind is in an open position; and
 (c) a connecting tape for connecting adjacent slats to each other and for retaining said window-blind in said fan-shape when said window-blind is in an open position, wherein each slat comprises six apertures, said apertures being spaced across the width of each slat such that a sixth aperture is positioned adjacent one elongated edge of each slat and five apertures are positioned in a group adjacent a second elongated edge of each slat,
 wherein said connecting tape is wound through said apertures such that said tape is inserted from a first side of each slat through said sixth aperture to a second side of each slat, through a fifth aperture back to said first side, thereafter passing over a fourth aperture along said first side through a third aperture back to said second side, through a second aperture back to said first side, through a first aperture back to said second side, passing over said second and third apertures along said second side, through said fourth aperture back to said first side, and through said fifth aperture, adjacent to itself, back to said second side and to a first side of an adjacent slat.

3. A window-blind for use in vehicles comprising:
 (a) means for removably attaching said window-blind to a window of said vehicle;
 (b) a plurality of elongated slats, each of said slats having one end pivotally connected to said attaching means, said plurality of slats being stacked one on top of another when said window-blind is in a closed position, and being opened into a fan-shape when said window-blind is in an open position; and
 (c) a connecting tape for connecting adjacent slats to each other and for retaining said window-blind in said fan-shape when said window-blind is in an open position, wherein each slat comprises five apertures, said apertures being spaced across the width of each slat, such that a fifth aperture is positioned adjacent one elongated edge of each slat and four apertures are positioned adjacent a second elongated edge of each slat,
 wherein said connecting tape is wound through said apertures such that said tape is inserted from a first side of each slat through said fifth aperture to a second side of each slat, through a fourth aperture back to said first side, passing over a third and a second aperture along said first side, through a first aperture back to said second side, through said second aperture back to said first side, through said third aperture back to said second side and to a first side of an adjacent slat.

4. A window-blind for use in vehicles comprising:
 (a) means for removably attaching said window-blind to a window of said vehicle;
 (b) a plurality of elongated slats, each of said slats having one end pivotally connected to said attaching means, said plurality of slats being stacked one on top of another when said window-blind is in a closed position, and being opened into a fan-shape when said window-blind is in an open position; and
 (c) a connecting tape for connecting adjacent slats to each other and for retaining said window-blind in said fan-shape when said window-blind is in an open position, wherein each slat comprises five apertures, said apertures being spaced approximately equi-distant from one another across the width of each slat,
 wherein said connecting tape is wound through said apertures such that said tape is inserted from a first side of each slat through a fifth aperture to a second side of each slat, through a fourth aperture back to said first side, passing over a third and a second aperture along said first side, through a first aperture back to said second side, through said second aperture back to said first side, passing over said third aperture along said first side, through said fourth aperture, adjacent to itself, back to said second side, through said third aperture back to said first side, through said second aperture, adjacent to itself, back to said second side and to a first side of an adjacent slat.

5. A window-blind for use in vehicles comprising:
 (a) means for removably attaching said window-blind to a window of said vehicle;
 (b) a plurality of elongated slats, each of said slats having one end pivotally connected to said attaching means, said plurality of slats being stacked one on top of another when said window-blind is in a closed position, and being opened into a fan-shape when said window-blind is in an open position; and (c) a connecting tape for connecting adjacent slats to each other and for retaining said window-blind in said fan-shape when said window-blind is in an open position, wherein each slat comprises five apertures, said apertures being spaced across the width of the slat such that a fifth aperture is positioned adjacent one elongated edge of each slat and four apertures are positioned adjacent a second elongated edge of each slat, wherein said connecting tape is wound through said apertures such that said tape is inserted from a first side of each slat through said fifth aperture to a second side of said slat, through a fourth aperture back to said first side, through a third aperture back to said second side, through a second aperture back to said first side, through a first aperture back to said second side, passing over said second aperture along said second side, through said third aperture, adjacent to itself, back to said first side, through said fourth aperture, adjacent to itself, to said second side and to a first side of an adjacent slat.

6. A window-blind in accordance with any one of claims 1-5, wherein said attaching means comprises at least one suction cup.

7. A window-blind in accordance with any one of claims 1-5, wherein each of said slats is curved, and wherein the first side of each of said slats is convex, and wherein the second side of each of said slats is concave.

* * * * *